Dec. 23, 1930.  J. W. SANFORD  1,786,367
AUTOMATIC COMPRESSOR CONTROL SYSTEM
Filed June 1, 1928
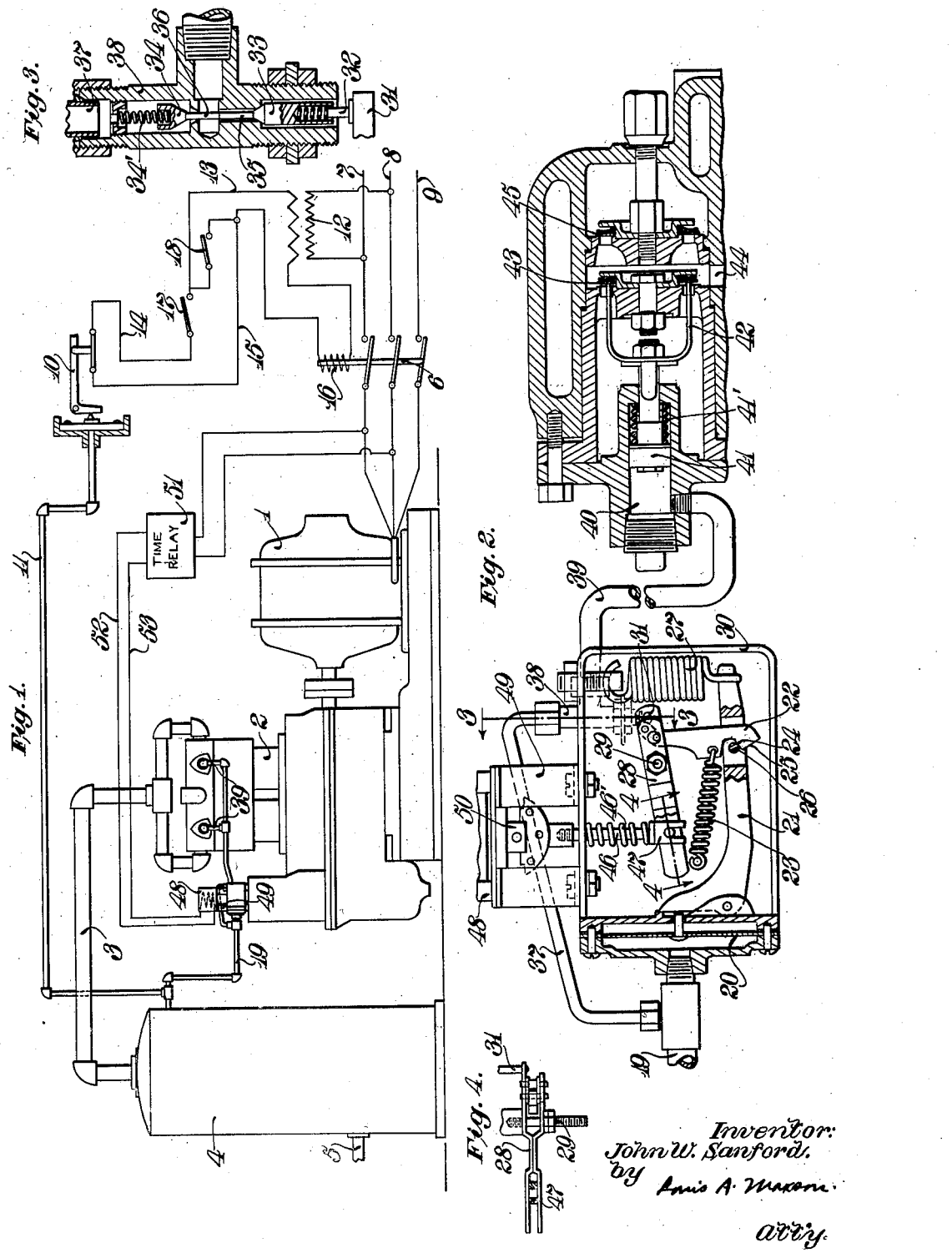
Inventor:
John W. Sanford.
by
Amos A. Maxon
atty.

Patented Dec. 23, 1930

1,786,367

UNITED STATES PATENT OFFICE

JOHN W. SANFORD, OF CLAREMONT, NEW HAMPSHIRE, ASSIGNOR TO SULLIVAN MACHINERY COMPANY, A CORPORATION OF MASSACHUSETTS

AUTOMATIC COMPRESSOR-CONTROL SYSTEM

Application filed June 1, 1928. Serial No. 282,256.

My invention relates to an improved automatic system for controlling the output of a fluid compressor.

Under certain operating conditions for compressors, especially of the smaller and medium sizes, a system of controlling the quantity of fluid compressed by means solely of an unloading device which loads and unloads the compressor, leaving the motor and compressor running idle during certain periods, is unsuitable, due to the fact that during comparatively long intervals when a very small amount of air is being consumed the compressor and its driving motor will be running idle. Such idle operation of course consumes a considerable amount of power and subjects the machinery to constant wear without producing any useful result during the intervals when the compressor is running unloaded. At other times, however, the demand for compressed fluid may reach a point very close to or equal to the capacity of the compressor. If therefore automatic means are provided for starting and stopping the motor in response to demands for air in order to take care of the objections to loading and unloading the compressor while running, such automatic starting and stopping mechanism will be required to operate at very frequent intervals. The power required for starting up the motor and compressor under such conditions may be more than enough to offset the power which would have been required to run the motor and compressor idle during the period when the compressor would have been unloaded if the unloading system were employed. Also the wear and tear on the automatic motor starting equipment, if required to operate at frequent intervals, may be more objectionable than the wear on the compressor and motor during a short idle period.

In many compressor installations, for example, where compressed air is used for industrial or mining operations, the quantity of compressed air required during day periods of greatest activity will probably be such that the controlling system which would be most suitable for controlling the output of the compressor would be one of the loading and unloading type, leaving the motor and compressor running continuously. During certain other comparatively long periods, for example, during the noon hour and during the night the compressor may be required to deliver only a very small amount of air to keep up the pressure in the system. Under these latter conditions it would be advantageous to control the compressor output by automatically starting and stopping the motor.

One of the primary objects of this invention is therefore to devise an improved control system which will enable the compressor output to be controlled selectively by a compressor loading and unloading system or by a motor start and stop system. A further object of my invention is to provide improved means for automatically maintaining the compressor unloaded until it comes up to speed. This is especially advantageous when the automatic start and stop system is being employed, but is of course equally useful at any time the compressor is started up either automatically or manually. Other objects and advantages of the invention will hereinafter more fully appear.

In the accompanying drawings I have shown for purposes of illustration one embodiment which my invention may assume in practice.

In these drawings,—

Fig. 1 is a diagrammatic view of a compressor outfit having an illustrative embodiment of my improved controlling mechanism associated therewith.

Fig. 2 shows the pilot valve mechanism of Fig. 1 with parts in section, and a section through the head of the compressor showing the unloader.

Fig. 3 is a detail sectional view on the plane of line 3—3 of Fig. 2, but with the fluid connection with the unloading mechanisms proper turned through an angle of 90°, and Fig. 4 is a fragmentary sectional view on line 4—4 of Fig. 2.

Referring to Fig. 1, there is shown an electric motor 1 driving a compressor 2 herein of the vertical two-cylinder type, although it will be understood that my invention is equally applicable to any of the general types of compressors. The fluid is discharged from the compressor through a suitable pipe connection 3 into a receiver tank 4 from which it may be supplied through an outlet 5 for any purpose desired. I have illustrated a simple three-pole switch 6 for controlling the motor's supply of power which in this instance may be three-phase, alternating current from the lines 7, 8 and 9. This starting switch is intended only to be illustrative of a suitable starting mechanism for the motor, and it will be understood that any of the well known commercial types of starters which may, if desired, have incorporated therewith means to provide for "no voltage" and "overload" protection, may be used in the place of the three-pole switch shown.

Means are provided for automatically starting and stopping the motor under certain conditions in response to receiver tank pressure. For this purpose a suitable pressure operated switch 10 is connected by a pipe 11 to the receiver tank. A switch suitable for this purpose is well known in the art and accordingly has not been illustrated in complete detail. Preferably a switch will be selected which will open and close within limits of pressure which may be varied between five and thirty pounds per square inch. The pressure switch is connected into a control circuit to which energy is supplied from the main line though a small transformer 12, which control circuit includes the wires 13, 14 and 15 and a solenoid 16 which operates when energized to connect the motor with the main line. A manually controlled switch 17 is normally closed when it is desired to allow the motor to be automatically started and stopped by the pressure switch 10. The control circuit may be independently controlled by means of a second manually operated switch 18 which is connected in parallel with the pressure switch 10.

The mechanism employed for loading and unloading the compressor in response to variations in receiver tank pressure is substantially similar to that disclosed in my copending application Serial No. 262,520, filed March 17, 1928, to which reference may be had for a detailed description of the mechanism. Only the general features of the pilot valve and unloader shown in Fig. 2 will be described at this point.

A pipe 19 supplies pressure from the receiver tank to the diaphragm 20 of the pilot valve mechanism. This diaphragm acts through a bell crank lever 21 and a floating cam lever 22 to control the pilot valve illustrated in Fig. 3. This control is effected by means of a spring 23 acting on lever 22 to raise or lower said lever by cooperation with the cam shaped surfaces 24 and 25 depending on the position of pin 26 which is fixed in the bell crank lever. The diaphragm pressure acts against a comparatively large tension spring 27, the tension of which may be adjusted to vary the pressure at which the mechanism operates. The motion of the link 22 controls the position of a lever 28 which is pivotally mounted at 29 to a frame 30 which also serves as a mounting for the diaphragm and bell crank lever. A pin 31 is carried at one end of this lever in position to engage a plunger 32 for controlling the pilot valve. It will be noted that lever 28 is shown in position to lift the pin 31 and thus the vent valve 33 is held closed while valve 34 is held open due to the engaging of plungers 35 and 36 on the valves 33 and 34 respectively. The valve 34 controls flow of pressure fluid from the pipe 19 through a line 37 to the valve casing 38 and thence through suitable connections 39 to the unloader for each compressor cylinder. This unloader is herein illustrated as being of the inlet valve opening type wherein there is employed as small cylinder 40 to which pressure fluid is supplied to operate on a piston 41, which has connected thereto a suitable valve engaging yoke 42 to lift and hold the plate valve 43 off its seat. The piston of the compressor then reciprocates without doing any work, the fluid passing in and out through passage 44 and inlet valve opening. 45 indicates the discharge valve mechanism in this particular design of compressor.

Suitable means is provided for controlling the pilot valve mechanism so as to hold the compressor unloaded at certain times independently of the receiver tank pressure. This means comprises a plunger 46 having a yoke 47 and normally actuated by a spring 46' to hold the lever 28 in the position shown, thereby unloading the compressor by closing the vent valve and opening the supply valve to the unloader cylinder 40. A solenoid 48 is mounted by means of brackets 49 on the frame 30 of the pilot valve mechanism and the core 50 of this solenoid is directly connected to the plunger 46. Thus when the solenoid is energized the plunger is held against the tension of spring 46' and the yoke 47 is withdrawn from engagement with lever 28 and the pilot valve mechanism is permitted to operate in response to receiver tank pressure acting on the diaphragm 20. The energization of this solenoid is controlled by means of a time delay relay 51 which is connected to the power supply lines for the motor on the motor side of the starting mechanism and acts to send current through lines 52 and 53 a certain time after the starting mechanism has been operated to start the motor. This time delay relay may be of any one of several well known commercial types and accordingly has not been illustrated and described in detail.

The operation of my improved compressor controlling system will be now easily understood in view of the above description. All the parts are shown in the position they would assume before the motor is started. Both switches 17 and 18 are shown in open position, thereby opening the control circuit through the solenoid 16 and disconnecting the motor from the line. The solenoid 48 is de-energized, allowing spring 46' acting through yoke 47 and lever 28 to hold the pilot valve in the position illustrated in Fig. 3, thereby allowing pressure fluid to be admitted from the receiver tank 4 through lines 19, 37 and 39 to the cylinders 40 of the compressor unloader. The pistons 41 are actuated against the tension of springs 41' and yoke 42 engages the inlet valve 43 and holds it off its seat.

Now assume that it is desired to start the compressor at the beginning of a day shift when it is contemplated that a considerable amount of compressed air will be needed. Switch 17 is left open and switch 18 closed, thereby allowing the solenoid coil 16 to be energized by current supplied through the transformer 12, and the starting mechanism, herein the starting switch 6, is operated to start the compressor driving motor. During the starting period the compressor is held unloaded by the spring pressed plunger 46 acting through the lever 28. As soon as the line switch 6 closes, the time delay relay 51 will be set in operation and at about the time the compressor comes up to speed will operate to supply current through the lines 52 and 53 to energize solenoid 48 and retract the plunger 46 against the tension of spring 46'. Then assuming that the pressure in the receiver tank is low, the pin 26 will be in position to engage the top cam surface 24 and spring 23 will cause the pin to ride up over the surface 24 and pull the link 22 and lever 28 downward. This allows pin 31 to drop, thereby permitting spring 34' to operate the pilot valves to the opposite position, that is, closing valve 34 and opening vent valve 33. The unloader cylinders 40 are then vented to the atmosphere and the compressor is loaded, but only after it has come up to substantially its normal operating speed. When the pressure in the receiver tank rises to a predetermined maximum, it will act on the diaphragm 20 and lower the pin 26 carried by the bell crank lever 21. When this pin comes into the position to engage the surface 25, which is inclined in the opposite direction to surface 24, the spring 23 will cause the link 22 and lever 28 to be elevated thereby lifting pin 31 and simultaneously moving valves 33 and 34 upwardly in position to close the vent and open the supply line to supply pressure fluid to the compressor unloaded cylinders. The pilot valve mechanism will thus take care of loading and unloading the compressor in response to pressure changes in the receiver tank as long as the compressor and motor are running.

Now supposing that a period is contemplated where there will be little demand for compressed air, but it is desired to operate the compressor to supply what may be needed and to keep up the pressure in the system. Switch 17 will be closed and switch 18 opened. This will permit the pressure switch 10 automatically to control the energization of coil 16 and thus control the starting mechanism for the motor. The pressure switch is set to open at a somewhat lower pressure than the pilot valve mechanism is set to unload the compressor so that it will open and cause the motor to be stopped before it is unloaded by the pilot valve mechanism. When the pressure in the receiver tank drops to a predetermined low limit, the pressure switch again closes, thereby causing the motor to be automatically started. Each time the motor is shut down, either manually or automatically, it is automatically unloaded due to the fact that solenoid 48 is de-energized and the spring 46' holds the pilot valve in unloaded position. Also it is maintained in unloaded condition independently of receiver tank pressure during the starting period when it is desired to make the load on the motor as light as possible. It will be noted that in the event that the pressure switch fails for any reason to cause the motor to be stopped at a pressure at which the pressure switch would normally so function, any possibility of injury to the system is precluded by the fact that at only a slight further increase in pressure the pressure operated pilot valve mechanism will cause unloading.

As a result of my invention it will therefore be seen that an improved pressure controlling system has been devised which will enable the compressor to be automatically controlled in the manner most suited to the particular conditions contemplated. Also that it is a very easy matter to switch from one type of control to the other so that the advantages to be derived from either particular type of control may be extended to comparatively brief intervals.

While I have in this application specifically described one embodiment which my invention may assume in practice, it will be understood that this form of the same has been used for purposes of illustration and that the invention may be modified and embodied in various other forms without departing from its spirit or the scope of the appended claims.

What I claim as new and desire to secure by Letters Patent is:

1. In an automatic compressor control system, in combination, a compressor, a driving motor therefor, means including a pressure responsive device for automatically starting and stopping the compressor in response to variations in compressor discharge pressure, an unloading device for said compressor automatically operable to cause loading and unloading in response to discharge pressure, said start and stop means and said unloading device being selectively operable to accomplish their respective functions, and control means operable either to render said start and stop means effective or to render such means ineffective while control is effected by said unloading device during continuous running of the compressor.

2. In an automatic compressor control system, in combination, a compressor, a driving motor therefor, means including a pressure responsive device for automatically starting and stopping the compressor in response to variations in compressor discharge pressure, an unloading device for said compressor automatically operable to cause loading and unloading in response to discharge pressure, and manually operable means controllable at will selectively to render either said start and stop means or said unloading device operable to control the quantity of fluid compressed, respectively by intermittently starting and stopping the compressor or intermittently unloading the compressor while running.

3. In an automatic compressor control system, the combination set forth in claim 1 wherein there is further provided means for maintaining the compressor unloaded at starting until it has reached substantially its normal operating speed.

4. In an automatic compressor control system, the combination set forth in claim 1 wherein there is further provided automatic means for holding said unloading device in unloaded position at starting of said motor until it has reached substantially its normal operating speed.

5. In an automatic compressor control system, in combination a compressor, an electric driving motor therefor, means including a pressure switch connected to the discharge side of the compressor for automatically starting and stopping said motor in response to variations in compressor discharge pressure, an unloading device for said compressor automatically operable to cause loading and unloading in response to discharge pressure, said start and stop means including said pressure switch and said unloading device being selectively operable to control the quantity of fluid compressed respectively by intermittently starting and stopping the compressor or intermittently unloading the compressor while running, and means positionable to predetermine which of the two types of control will be in effect.

6. The combination with an automatic compressor control system as set forth in claim 5, of an electrically controlled time delay relay, and electro-magnetic means controlled thereby for maintaining said compressor unloaded during the starting period until the motor has reached substantially its normal operating speed.

7. The combination with an automatic control system for compressors as set forth in claim 5, of electro-magnetic holding means for holding said unloading device in unloaded position when energized, and means for energizing said electro-magnetic means during the starting period of said motor.

8. In an automatic compressor control system, in combination, a compressor, a storage tank for compressed fluid, an electric motor for driving said compressor, means including a pressure switch and a circuit controllable thereby for automatically starting and stopping the compressor in response to variations in tank pressure, manually operable means for controlling said circuit independently of said switch, and an unloading device for said compressor automatically operable to cause loading and unloading in response to tank pressure, said manually operable means controllable at will selectively to render either said pressure switch or said unloading device operative to control the quantity of fluid compressed respectively by intermittently starting and stopping the compressor or intermittently unloading the compressor while running.

9. In an automatic compressor control system, in combination, a compressor, a receiver tank for storage of compressed fluid, an electric driving motor for said compressor, electrically operated starting mechanism controlling starting and stopping of said motor, electrical means for operating said starting mechanism to starting position including a control circuit, a pressure switch responsive to pressure on the discharge side of said compressor, and a manually operable switch, said switches being connected in parallel into said circuit and being selectively operable to control said starting mechanism.

10. The automatic compressor control system set forth in claim 9 in combination with an unloading device for said compressor automatically operable to cause loading and unloading in response to discharge pressure when said circuit is controlled by said manually operable switch.

11. In an automatic compressor control system, in combination, a compressor, a driving motor therefor, means for automatically starting and stopping the compressor in response to variations in discharge pressure, an unloader for said compressor adapted to hold a compressor unloaded when subjected to pressure, a device for automatically causing said unloader to be subjected to pressure when the compressor discharge presure has reached a predetermined maximum, said starting and stopping device and said unloading device being selectively operable to control the quantity of fluid compressed respectively by intermittently starting and stopping the compressor or intermittently unloading the compressor while running, and means positionable to predetermine which of said devices will control the quantity of fluid compressed.

12. In combination, a pump, a motor for driving the pump, a plurality of selectively operable independent automatic control systems for controlling the output of said pump in accordance with the demand for pumped fluid, and manually operable means for predetermining connection of one or the other of said systems with said motor pump combination for control of the pump output thereby.

13. In combination, a compressor, a motor for driving the compressor, automatic motor start and stop means responsive to compressor discharge pressure for automatically controlling the output of said compressor in accordance with the demand for pumped fluid, an unloader for unloading said compressor, a regulator responsive to compressor discharge pressure for controlling said unloader to vary the compressor output in accordance with the demand for pumped fluid while the motor is running continuously, and manually operable means for predetermining connection of either said motor start and stop means or said unloading mechanism with said motor compressor combination for control of the compressor output thereby.

14. In combination, a compressor, a motor for driving the compressor, automatic motor controlling means including a pressure responsive switch operative on a predetermined high compressor discharge pressure to stop the motor and on a predetermined low compressor discharge pressure to automatically start the motor, means for rendering said automatic motor controlling means ineffective whereby the motor is permitted to run continuously, an unloader for the compressor, a regulator controlling the unloader responsive to a second predetermined high compressor discharge pressure higher than said first mentioned high compressor discharge pressure for automatically causing unloading when said automatic motor control means is ineffective.

15. In combination, a pump, unloading means therefor operable when subjected to an unbalanced pressure, a pilot valve mechanism for controlling the operation of said unloading means in the manner aforesaid, controlling means for said pilot valve responsive to variations in the pressure affected by the loaded operation of said pump, electro-magnetic means for controlling the operation of said pilot valve independently of the variations last mentioned, electric driving means for said pump, means controlled with the current supply to said motor for effecting operation of said electro-magnetic means a predetermined time after starting of said motor, and means for controlling current supply to said motor to control starting and stopping thereof including a switch having controlling means responsive to variations in the pressure affected by the loaded operation of said pump but responsive to a variation less extreme than the upper one of the variations controlling said pilot valve controlling means.

16. In combination, a pump, unloading means therefor operable when subjected to an unbalanced pressure, a pilot valve mechanism for controlling the operation of said unloading means in the manner aforesaid, controlling means for said pilot valve responsive to variations in the pressure affected by the loaded operation of said pump, electro-magnetic means for controlling the operation of said pilot valve independently of the variations last mentioned, electric driving means for said pump, means controlled with the current supply to said motor for effecting operation of said electro-magnetic means a predetermined time after starting of said motor, means for controlling current supply to said motor to control starting and stopping thereof including a switch having controlling means responsive to variations in the pressure affected by the loaded operation of said pump but responsive to a variation less extreme than the upper one of the variations controlling said pilot valve controlling means, and means for short-circuiting said switch.

17. In combination, a pump, unloading means therefor operable when subjected to an unbalanced pressure, a pilot valve mechanism for controlling the operation of said unloading means in the manner aforesaid, controlling means for said pilot valve responsive to variations in the pressure affected by the loaded operation of said pump, electro-magnetic means for controlling the operation of said pilot valve independently of the variations last mentioned, electric driving means for said pump, means controlled with the current supply to said motor for effecting operation of said electro-magnetic means a predetermined time after starting of said motor, means for controlling current supply to said motor to control starting and stopping thereof including a switch having controlling means responsive to variations in the pressure affected by the loaded operation of said pump but responsive to a variation less extreme than the upper one of the variations controlling said pilot valve controlling means, and a circuit controlled by said switch and including the secondary winding of a transformer supplied with current from the supply for the motor.

18. In combination, a pump, a motor for driving the pump, a plurality of selectively operable independent automatic control systems for controlling the output of the pump in accordance with the pressure which is a function of the operation of the pump, one of said control systems being operable at a pressure nearer to atmospheric than the other to effect discontinuation of pumping, and manually operable means for rendering said last mentioned control system ineffective to permit control by the other control system.

19. In combination, a pump, a motor for driving the pump, a plurality of selectively operable independent automatic control systems for controlling the output of the pump in accordance with the pressure which is a function of the operation of the pump, one of said control systems being operable at a pressure nearer to atmospheric than the other to effect discontinuation of pumping, and manually operable means for rendering said last mentioned control system ineffective to permit control by the other control system, said control systems each including a means for precluding loading except when said motor is driving said pump at substantially full speed.

20. In combination, a pump, mechanism controlled by the pressure affected by the loaded operation of said pump for stopping the driving of the pump when said pressure differs by a predetermined amount from atmospheric pressure, and means for unloading said pump operable to effect unloading when the pressure affected by the loaded operation of said pump differs from atmospheric pressure slightly more.

In testimony whereof I affix my signature.

JOHN W. SANFORD.